United States Patent
Dunn (10) Patent No.: US 7,333,818 B2
(45) Date of Patent: Feb. 19, 2008

(54) SYSTEM AND METHOD FOR CALL PROCESSING IN A MOBILE DEVICE WITH POSITION LOCATION CAPABILITY

(75) Inventor: Doug Dunn, Chula Vista, CA (US)

(73) Assignee: Kyocera Corporation, Kyoto (JP)

( * ) Notice: Subject to any disclaimer, the term of this patent is extended or adjusted under 35 U.S.C. 154(b) by 60 days.

(21) Appl. No.: 11/212,831

(22) Filed: Aug. 25, 2005

(65) Prior Publication Data

US 2007/0049287 A1    Mar. 1, 2007

(51) Int. Cl.
*H04Q 7/20* (2006.01)
(52) U.S. Cl. .............. 455/456.1; 379/374.01; 455/404.2
(58) Field of Classification Search ............. 455/456.1, 455/457, 404.1, 414.1, 414.2, 414.3, 563; 379/374.01
See application file for complete search history.

(56) References Cited

U.S. PATENT DOCUMENTS

| | | | |
|---|---|---|---|
| 6,269,402 B1 * | 7/2001 | Lin et al. ................. 709/227 |
| 6,400,954 B1 * | 6/2002 | Khan et al. ............... 455/450 |
| 6,415,154 B1 * | 7/2002 | Wang et al. ............ 455/456.1 |
| 6,526,283 B1 * | 2/2003 | Jang ...................... 455/456.5 |
| 6,590,875 B1 * | 7/2003 | Niwa ....................... 370/328 |
| 6,690,938 B1 * | 2/2004 | Chin ........................ 455/450 |
| 6,766,159 B2 * | 7/2004 | Lindholm ............... 455/404.1 |
| 6,816,711 B2 * | 11/2004 | Standke et al. ............ 455/73 |
| 7,072,686 B1 * | 7/2006 | Schrager ................. 455/556.1 |
| 2002/0098844 A1 * | 7/2002 | Friedenfelds et al. ....... 455/445 |
| 2002/0136384 A1 * | 9/2002 | McCormack et al. ... 379/215.01 |
| 2004/0091085 A1 * | 5/2004 | Suganuma et al. .......... 379/45 |
| 2005/0059390 A1 * | 3/2005 | Sayers et al. ............. 455/425 |
| 2005/0213716 A1 * | 9/2005 | Zhu et al. ................... 379/45 |

FOREIGN PATENT DOCUMENTS

JP    2004-015717    1/2004

OTHER PUBLICATIONS

Norikazu, et al., "Cellular Phone with Priority Control Function", ABSTRACT, JP 2004-015717, www.aurekaontap.com, 1 pg.

* cited by examiner

*Primary Examiner*—Rafael Perez-Gutierrez
*Assistant Examiner*—Nimesh Patel (57) ABSTRACT

An exemplary wireless device includes a communication radio and a position location receiver. When the wireless device has established a call with the communication radio, and a request for position location is received, the communication radio is deactivated while the position location information is collected using the position location receiver. A local warning message is communicated to the user of the mobile device while the communication radio is disabled. The warning message may be a text display, a graphical display, an audio message, or an input-key challenge. By generating and presenting the local warning message, the user is made aware that the lack of normal call activity is expected and temporary. After the position location information is collected, the call is resumed with the communication radio, and the position location information is transmitted. Since the mobile device is now acting with normal call activity, the local warning is removed.

24 Claims, 4 Drawing Sheets

SYSTEM AND METHOD FOR CALL PROCESSING IN A MOBILE DEVICE WITH POSITION LOCATION CAPABILITY

FIELD OF THE INVENTION

The present invention relates generally to the field of wireless communication devices, and, more particularly, to a wireless mobile unit operating position location processes.

BACKGROUND OF THE INVENTION

Wireless communication devices are widely used, and have become an essential aspect of modern life. Wireless communication devices such as pagers, mobile phones, text pagers, PDA's (personal data assistants) are used for work, for personal activities, and as a way to keep in contact with family and friends. These wireless device are increasingly available in cars, boats, appliances, and entertainment equipment. As the number and type of these wireless devices increase, application developers continue to provide exciting and innovative applications to make the wireless devices easier to use, and to enhance their usefulness. Further, wireless service providers have invested heavily in infrastructure equipment to support higher data rates to wireless devices, and thereby are enabling a wide range of new and exciting applications.

More often, these wireless communication devices are provided with position location capability. To enable position location capability, the wireless device typically has a GPS receiver for receiving GPS satellite data. The wireless device may have a local processor for determining its position, or may rely on infrastructure equipment to assist in determining location. The growth in position location enabled devices is due in part to the implementation of the E911 system in the United States. The E911 system is mandated by the US Federal Communications Commission. Generally, the E911 system requires that the operator of a public wireless communication system, upon the request from an emergency center, report the location of the mobile device that has placed an emergency 911 call. Since location information processes and infrastructures have been added to support E911, other applications are evolving to utilize the position information. For example, mapping, traffic, weather, and shopping applications may benefit from information about a user's specific location.

These wireless handsets most often access a wireless network according to well defined and well established standards. For example, wireless handsets may operate according to the well-defined standards for CDMA, WCDMA, UMTS, CDMA2000, GSM, GPRS, EDGE, PHS, UTRAN, FOMA, AMPS, or other standard. More particularly, these standards have matured to allow for seamless movement within a network, as well as between networks, even when the service providers change. The telephony functions operating between the handset and the network are consistently applied and used according to well defined processes. In this way, basic voice communication and basic data transmission may be reliably, robustly, and seamlessly provided to the users of wireless handsets.

Wireless communications systems generally have base stations and antennas which communicate with mobile wireless devices. These wireless devices may accommodate voice communication as well as data communication. For example, the wireless devices may be mobile phones, personal data assistants, or laptop computers. Since they are portable, the wireless devices are usually powered by a battery, and need to be sized for convenient use. Most commercial wireless communication systems comply with some international or regional standard to assure compatibility between the base station and the mobile devices. However, since there are several communication standards, mobile devices can only communicate in a compatible communication system. Since this has been found to be too limiting, mobile wireless devices are often adapted to operate in more than one communication system.

Wireless communication systems are generally arranged to operate in particular frequency range or communication band. For example, one communication system may operate in the PCS band, which operates in frequency band at approximately 1900 MHz. Another communication system may operate in the cellular band, which operates in frequency band at approximately 800 MHz. It has been found to be desirable to have mobile wireless devices capable of operating at multiple communication bands, and thereby able to operate on multiple communication systems. For example, it has been found particularly useful to have wireless mobile devices capable of operating on both the PCS and cellular systems. It will be appreciated that other frequency bands and communications standards may be used.

It has also been found desirable that a mobile wireless device be constructed to receive an auxiliary signal. A particularly useful auxiliary signal is the position location information signal provided by a GPS satellite system. In the GPS system, several satellites transmit a location beacon at about 1575 MHz that may be received by a GPS receiver. The GPS signal contains timing and location information that may be used to determine the location of the GPS receiver. In this way, a mobile wireless device receiving the GPS signal may provide location information for emergency personnel or other applications. The design and construction of a GPS receiver is well known, so will not be discussed in detail.

Even though mobile wireless devices have become more complex, market pressures demand higher performance and lower costs. In this regard, the manufacturing of mobile devices requires trade-offs between features, quality, and price. For example, cost and space may be saved by having one or more communication process share components. In one particular example, the communication radio and the GPS receiver may share a common radio frequency (RF) receive chain. The RF chain may include, for example, amplifiers, oscillators, filters, mixers, and other RF components. Of course, this means that when the GPS receiver is active, the communication radio receiver can not be operated. In another example, it may be desirable to make a less costly phone by using fewer or lower quality components in the GPS receiver. Then, to improve sensitivity to the low power GPS signal, the communication radio is deactivated while GPS data is collected.

Often, then, the communication radio is deactivated for the time period while the GPS data is being collected. This means that any communication call in progress will be suspended so that the GPS receiver may operate. During this suspended time period, which typically extends for several seconds, and even up to as much as one minute in low signal areas, the wireless device will not exhibit normal call activity. For example, the ear speaker may be silent, or the display may appear to be locked. In some circumstances, the user may become concerned with the lack of normal activity and terminate the call, or turn off the wireless device. By doing so, the user may cause errors or delays in the application, or may cause the application to reset and start over.

For example, if a mapping application has requested the location for the mobile device, and the user terminates the application while the mobile device is collecting GPS data, then the mapping application will have to re-request the location information. This unduly burdens the communication infrastructure, as well as increases the time for the application to provide useful information.

In a more troubling example, if the user places an emergency call, the user may hear "rings" in the earpiece, and then may hear a "click" as the emergency call center answers the call. Typically, an operator does not answer the call at this point, but the emergency call center sends a request for the location of the mobile device. This request is typically made using signaling or control channels, so the mobile user is unaware that the request has been made. Responsive to the request, the mobile device suspends the communication call, and activates its GPS receiver. Unfortunately, the mobile device no longer exhibits normal call activity, so the mobile user may terminate the call and re-dial 911, or reset the mobile phone because they believe it is not operating correctly. This not only wastes valuable time in contacting emergency personnel, but it also places additional burdens on the emergency communication process and infrastructure.

SUMMARY OF THE INVENTION

Briefly, the present invention provides a method for call processing operating on a wireless mobile device. The wireless device is constructed with a communication radio and a position location receiver. When the wireless device has established a call with the communication radio, and a request for position location is received, the communication radio receiver is deactivated while the position location information is collected using the position location receiver. A local warning message is communicated to the user of the mobile device while the communication radio is disabled. The warning message may be a text display, a graphical display, an audio message, or an input-key challenge. By generating and presenting the local warning message, the user is made aware that the lack of normal call activity is expected and temporary. After the position location information is collected, the call is resumed with the communication radio, and the position location information is transmitted. Since the mobile device is now acting with normal call activity, the local warning is removed.

In one particular example, a user makes an emergency 911 call on a mobile handset. The mobile handset establishes a call with an emergency center, and the emergency center makes a request for the mobile's position location. The mobile handset deactivates the communication channel with the emergency center, and activates a local GPS receiver to collect GPS data. As the communication channel is not active, the mobile handset generates a local warning that the emergency call is proceeding normally, and that the user should not terminate the emergency call. The warning message may be a text display, a graphical display, an audio message, or an input-key challenge. By generating and presenting the local warning message, the user is made aware that the lack of normal call activity is expected and temporary. After the GPS data is collected, the call is resumed with the communication radio, and the GPS data is transmitted. An emergency operator is now made aware of the mobile's location, and may now establish voice communication with the mobile user. Since the mobile device is now acting with normal call activity, the local warning is removed.

These and other features of the present invention will become apparent from a reading of the following description, and may be realized by means of the instrumentalities and combinations particularly pointed out in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
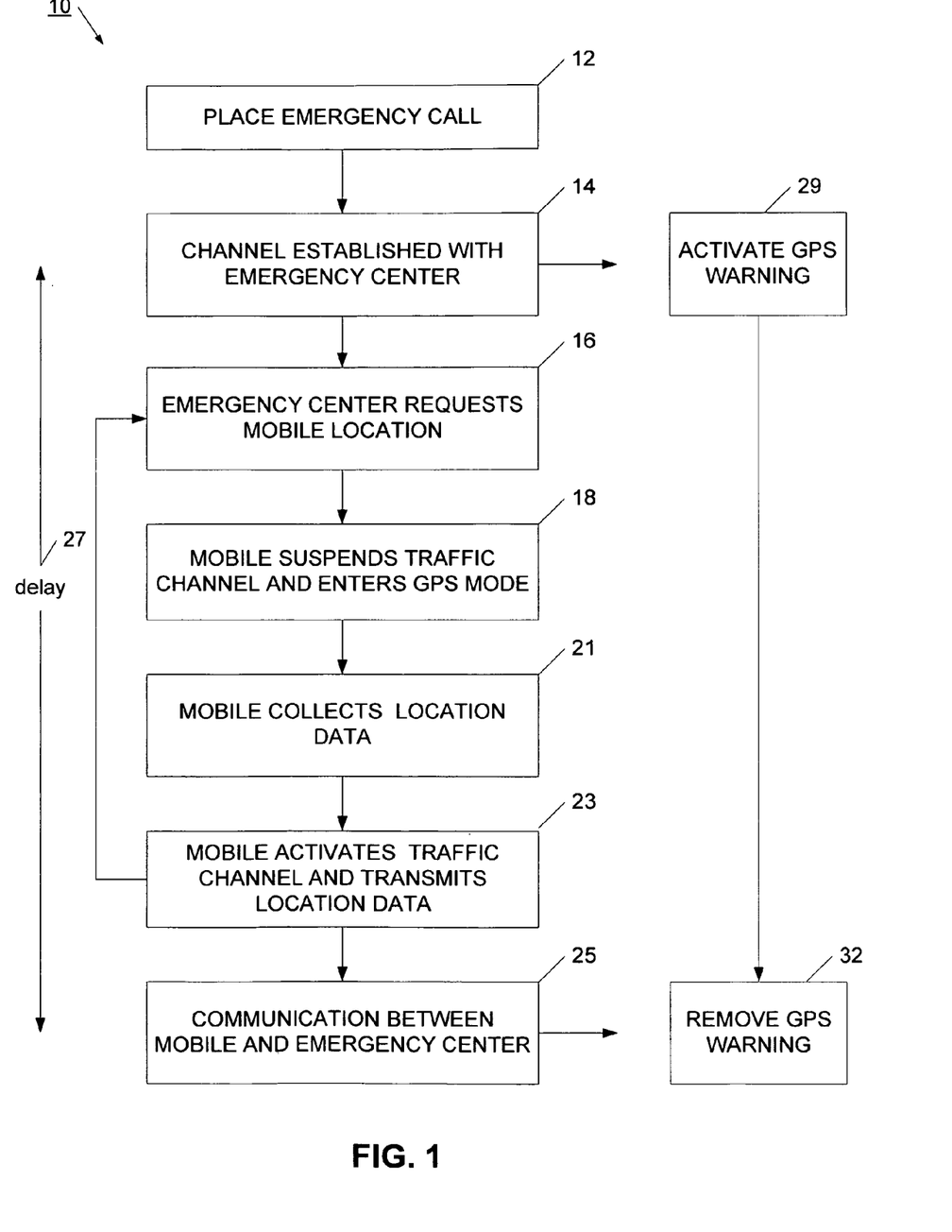
FIG. 1 is a flowchart of an emergency call process in accordance with the present invention.

Referring now to FIG. 1, method 10 for call processing is illustrated. Method 10 may be advantageously operated on a mobile communication device. For example, the mobile communication device may be a wireless portable handset, a personal data assistant, a portable computer, or a wireless module. Often, a wireless module is installed in vehicles, vending equipment, industrial monitors, or other devices. In this way, the wireless module enables wireless communication, data transfer, and position location applications for a wide variety of larger devices. The mobile communication device has a communication radio typically operating according to a communication standard. The communication standard may be, for example, CDMA, CDMA2000, WCDMA, UMTS, GSM, PHS, or PCS. It will be appreciated that communication standards continually evolve, and that other existing or evolving standards may be used. Further, some mobile communication devices operate according to proprietary communication standards, such as military or governmental emergency communication devices.

The mobile communication device establishes communication with a remote device through a communication infrastructure. The communication infrastructure typically comprises antenna systems, base stations, and interconnected network communications servers. Typically, many mobile communication devices may operate in the geographic area supported by the communication infrastructure. Each communication standard has detailed procedures that the mobile device and infrastructure follow to establish, maintain, and disconnect a call. The call may be a voice-only call, a data-only call, or a combination of voice and data. Typically, a communication standard enables the establishment of one or more channels according to the specific communication need.

The wireless mobile device also has a receiver configured to collect position application data. Typically, the receiver is a GPS receiver tuned to receive. data from several GPS satellites. Often, the GPS receiver shares the radio frequency (RF) receive chain with the communication radio. This sharing of resources allows for savings in cost, power, and space. However, by sharing the receive chain, only one of the receivers may be operational at any one time. For example, the GPS receiver cannot operate when the communication radio is active, and the communication radio can not operate when the GPS receiver is active. Accordingly, when the communication device needs to collect GPS position data, the communication radio receiver must be disabled. Further, some standards, such as CDMA, require that the transmitter also be disabled if the receiver is not functioning or receives insufficient signal quality for longer than a set period of time or more than a set number of frames. Therefore, both the transmitter and receiver are typically shut down on a CDMA device while GPS information is collected. Other standards may have different operational requirements when the mobile station receiver is disabled.

Referring again to method 10, an emergency call is placed as shown in block 12. Typically, in the United States, the emergency call will be a 911 call. Other countries and jurisdictions may have other centralized emergency call systems similar to the 911 system, or the call may be received directly by emergency personnel. The emergency call is routed through the infrastructure system and received by an emergency call center. The call may be received directly from the wireless operator, or may have been routed through a third party connection. In one example, the emergency call center is a public safety answering point, which is operated by local emergency authorities such as the local police or sheriffs department. The public safety answering point answers the emergency call, thereby establishing a communication with the mobile device that originated the emergency call, as shown in block 14. Although a call has been established, and the mobile user no longer hears a ring indicator, typically no voice communication is established between the mobile user and an emergency operator. Instead, the public safety answering point makes a request for position information for the mobile device. Typically, this request is made through an infrastructure data server, such as a position determining entity. This request is usually made to the mobile using a signaling or control channel, so the mobile user is not aware that the position location request has been made.

The position determining entity requests that the mobile report position location information, as shown in block 16. So that the mobile user understands that the emergency call is progressing normally, a local warning is generated at the mobile device as shown in block 29. This warning may be, for example, a textual message written to the screen display. The message may indicate that the call is progressing normally, and that the mobile user should not interrupt the call. In another example, the warning may be an audio message played through the earpiece or speaker that the call is progressing normally, and that the user should not interrupt the emergency call. Alternatively, the audio message may be of "comfort noise", which is noise projected through the earpiece so that a user perceives that a call is proceeding normally. In yet another example, the warning may include requiring the operator to comply with a challenge sequence to interrupt the emergency call. In this way, when the user attempts to disconnect, the user may be warned that the emergency call is progressing normally, and require the mobile user to confirm their intention to disconnect the normally functioning emergency call. It will be appreciated that the local warning may take other forms, and may be implemented using other output devices. For example, the content of the warning message may be provided by the server. In this way, the server could control the message seen by the user. In the example of the emergency call, the server could provide the estimated time for an emergency operator to answer, which could be presented as part of the local warning message.

The local warning is maintained while the emergency center and the mobile device cooperate to establish the location of the mobile device. During this process, the mobile device stops monitoring its communication channel with the emergency center, and activates its GPS receiver as shown in block 18. The mobile device then operates the GPS receiver to collect sufficient GPS data to establish the location of the mobile device, as shown in block 21. After the data has been collected, the mobile device resumes its communication channel with the emergency center, and transmits the GPS position data or information to the position determination entity, as shown in block 23. The position determination entity calculates the mobile device location, and the location of the mobile device is sent to the emergency center. The emergency center may now know the location for the mobile device, which typically is displayed to an emergency operator. The emergency operator may establish voice communication with the mobile user as shown in block 25. Once the communication channel has been opened and communication established with the emergency center, the local GPS warning may be removed as shown in block 32. In one example, the local GPS warning is removed upon re-establishing the communication channel. In another example, the local GPS warning is removed upon detecting a voice communication from the emergency center. It will be appreciated that the removal of the GPS warning may be made responsive to other factors.

Advantageously, the local GPS warning provides the mobile user with vital information that the emergency call is progressing normally during delay time 27. Without the local GPS warning, the mobile user would see no activity on the screen of the mobile device, and hear no activity on the earpiece of the mobile device during delay time 27. With no activity being sensed, the mobile user may believe something has gone wrong with emergency call, disconnect the call, and attempt to reconnect. This would waste valuable time, as well as unduly burden the emergency communication system. Since the delay time 27 may be several seconds long, the local warning provides a necessary information and calming effect for the mobile user.

Figure 2:
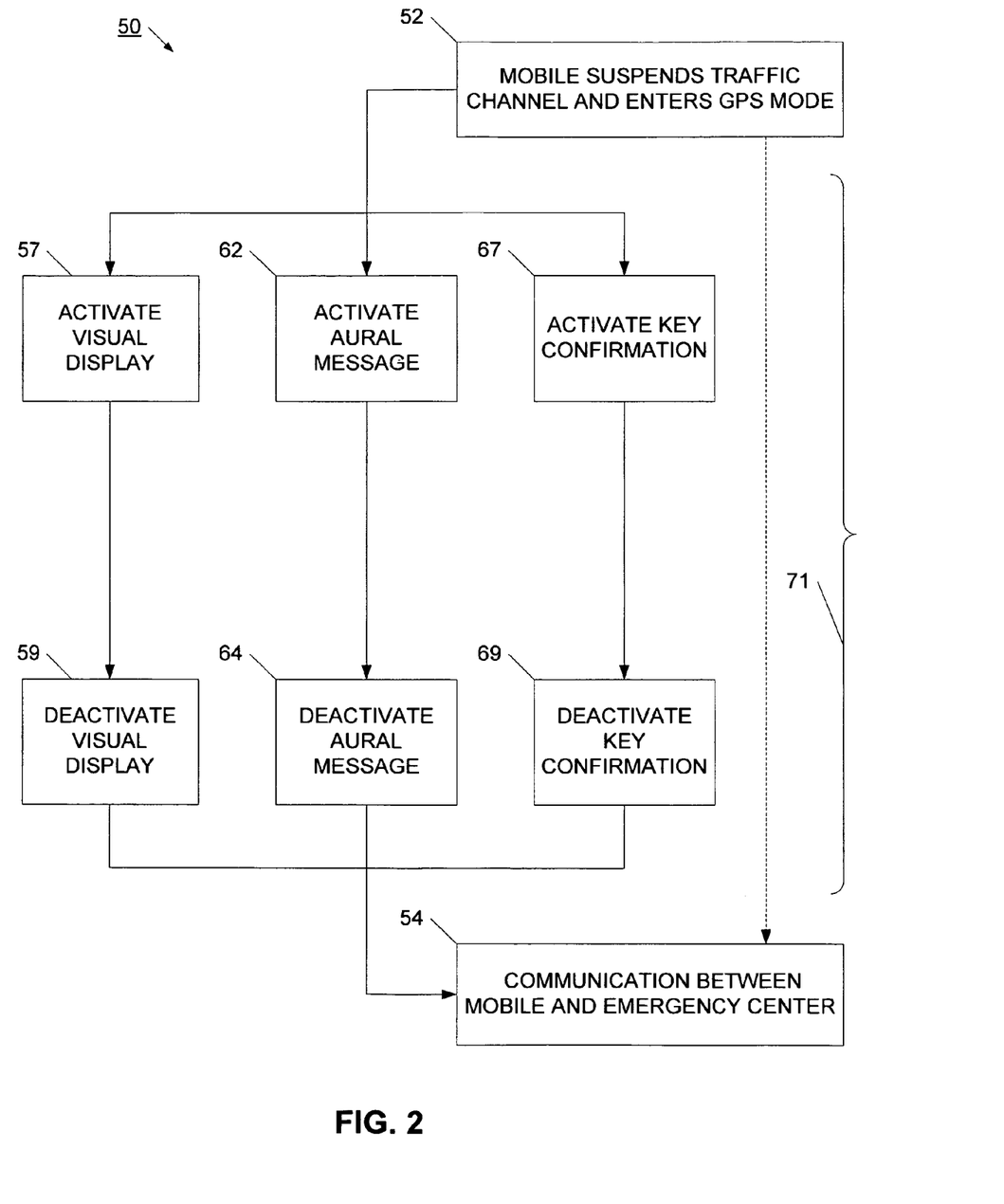
FIG. 2 is a flowchart of an emergency call process in accordance with the present invention.

Referring now to FIG. 2, call processing method 50 is illustrated. Method 50 may be advantageously operated on a mobile communication device. For example, the mobile communication device may be a wireless portable handset, a personal data assistant, a portable computer, or a wireless module. The mobile communication device has a communication radio for establishing communication through a wireless infrastructure. The mobile communication device also has a GPS receiver for collecting position location information such as GPS satellite data. The mobile device is constructed such that its communication receiver is deactivated when GPS information is being collected. This deactivation may be necessary if the communication radio and the GPS receiver share an RF receive chain. Also, in some environments, additional sensitivity to the GPS signal may be accomplished by deactivating the communication radio. As illustrated in method 50, the mobile communication device has established a call with a remote entity. The call may be a data call, a voice call, or a combination of voice and data. For example, the call may be a communication with a network server for assisting with driving or traffic instructions. In another example, the call may be an emergency call placed to an emergency call center.

The mobile device receives a request for position location information. This request may be received from the remote entity through the communication radio, or may be generated locally at the communication device. Responsive to receiving the request for location information, the mobile communication device shuts down its communication receiver and enters a GPS mode as shown in block 52. At this point, the communication channel has been effectively deactivated, and the mobile user would see no indication of an active call. To alleviate mobile user concerns, the mobile device generates a local warning for the user. This local warning may be predefined locally in the handset, or may be received from a remote location. If the local warning is received, then the remote server is able to adjust the specific message presented to the user. In one example, the local device activates a visual display as shown in block 57. In another example, the mobile device activates an aural message that is played through the earpiece or another speaker as shown in block 62. The aural message could be, for example, synthesized speech or comfort noise, which is a low-level noise played to the user to let them know a call is in progress. The display or speaker presents a message to the user that the call is progressing normally, and that the user should not interrupt the call. In another example of local warning, the local user may be forced to go through a key challenge routine to disconnect the call as shown in block 67. This key challenge may require that the user take additional steps or key inputs to actually end a call, and may include textual or audible messages. The local warning is continued through the entire delay time 71. Once the mobile device has finished collecting the position location information, the mobile device may resume full communication as illustrated in block 54. Since the mobile device now has normal indications of call activity, the local warnings may be deactivated as shown in blocks 59, 64, and 69. It will be appreciated that the visual, aural, and challenge warnings may be used individually or in combination, and that other types of local warnings or messages may be used in the alternative.

Figure 3:
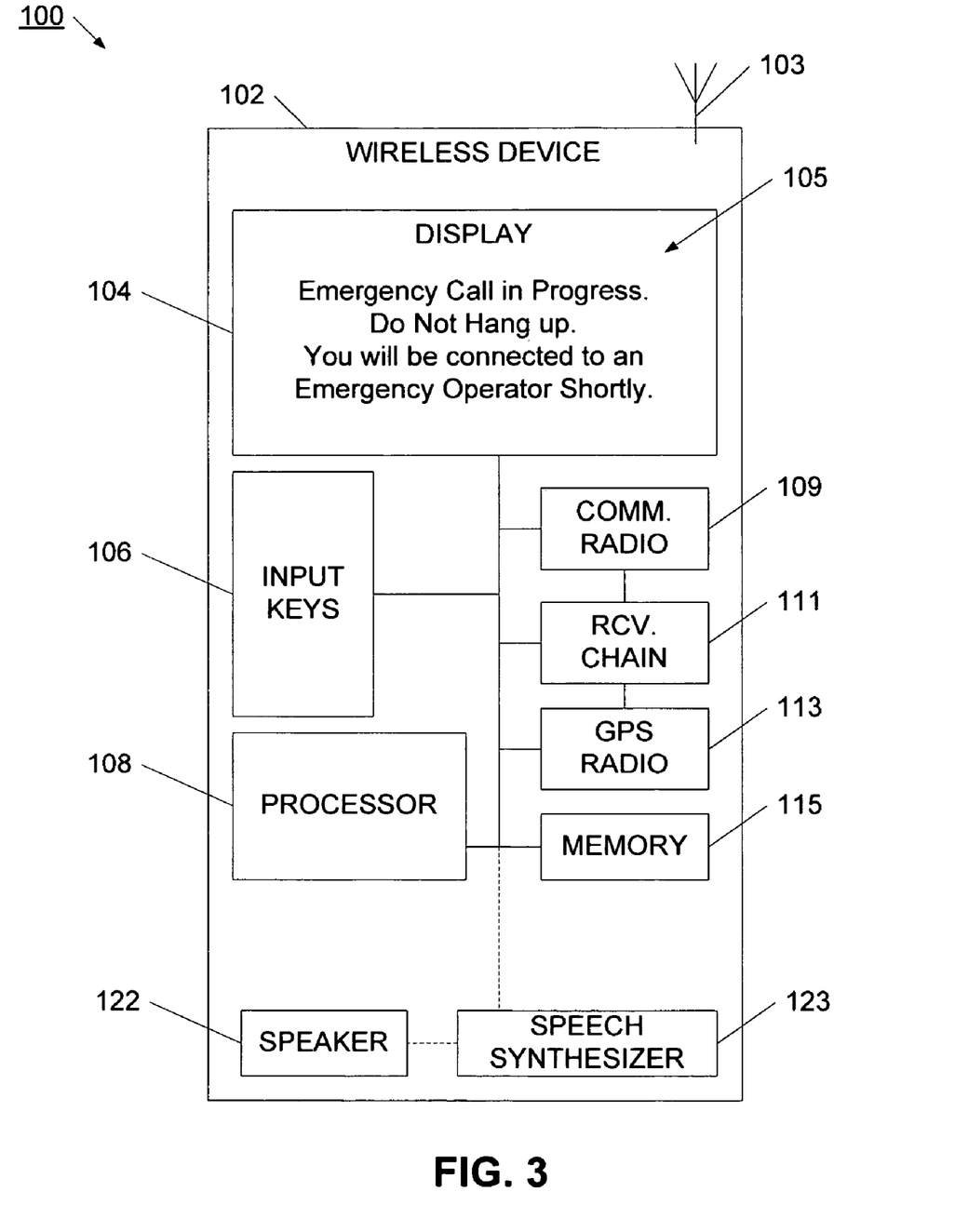
FIG. 3 is a block diagram of a wireless device operating an emergency call process in accordance with the present invention.

Referring now to FIG. 3, wireless device 100 is illustrated. Wireless device 100 operates as part of a wireless communication system. The wireless communication system has a network service area which may be, for example, a wireless communication network operated by a wireless service operator. This wireless communication network may comply with one or more international standards, for example CDMA, WCDMA, CDMA2000, GSM, PHS, UMTS, or other existing or evolving communications standard. Although the communication system is described with reference to a wireless communication network, it will be appreciated that other types of wireless networks may be used. It will be understood that the network service area may include several individual networks, which may be operated by the same or different service providers. Generally, the network service area includes a network infrastructure for interconnecting the various networks. This network infrastructure may include, for example, base stations, base station controllers, network backbone connections, and network servers. It will be appreciated that other components may be used to assist in interconnecting or operating the networks.

The communication system also includes mobile subscriber units, such as wireless device 100. It will be appreciated that many mobile subscriber units may operate within the network service area. For ease of explanation, only one mobile subscriber unit 100 will be described in detail. The mobile subscriber unit may be for example, a mobile wireless handset, a personal data assistant, or a portable computer. In another example, the mobile subscriber unit is a modem access device built into another device, such as a car, truck, or other vehicle. The mobile subscriber unit operates according to the same communication standard as the network infrastructure. As the mobile subscriber unit moves within the network service area, the mobile subscriber unit connects first through one network, and then as it moves, will connect through another network. In some cases, the networks are operated by the same service provider, and in other cases the networks maybe operated by different service providers. Some mobile subscriber units are constructed to operate in more than one mode or according to more than one communication standard. In this way, the mobile subscriber unit may operate in one mode or standard when connected through one network, and then may operate on a different mode or communication standard when moving into another network.

Wireless device 100 has housing 102 sized and constructed for portability. Housing 102 includes a textual and graphical display 104, input keys and controls 106, and speaker 122. Speaker 122 may be part of the earpiece, or may be constructed as a speaker phone device. Wireless device 100 includes processor 108 for operating application and call processing functions. Processor 108 cooperates with memory 115 for providing call processing and application functions. Wireless device 100 also includes communication radio 109, which may operate according to a communication standard such as CDMA, WCDMA, CDMA200, GSM, UMTS, PHS, PCS, or other existing or evolving communication standard. Wireless device 100 also includes GPS receiver 113. In some constructions, GPS receiver 113 and communication radio 109 share an RF receive chain 111. Receive chain 111 may include, for example, oscillators, amplifiers, filters, mixers, switches, matching circuits, or other RF components, such as antennae 103. In such a construction, only one of the communication radio 109 or GPS receiver 113 may fully operate at any one time. More particularly, when the GPS receiver 113 is active, the receiver portion of communication radio 109 must be deactivated. Even in devices that do not share an RF receive chain, it may be desirable to deactivate the communication radio to improve sensitivity of the GPS receiver.

Memory 115 holds predefined warning messages. These warning messages may take the form of a textual warning message, a graphical warning message, an aural warning message, or a key challenge set of instructions. In one example, when communication device 100 receives a request for position location information, the communication radio 109 is deactivated and GPS receiver 113 is activated. The warning message is retrieved from memory 115 and presented according to the predefined rules. For example, FIG. 3 shows a predefined textual message 105 for display on display 104. The warning message indicates that an emergency call is in progress and operating normally, and warns the mobile user that they should not interrupt the call. The local warning message also includes a confirmation that an operator will shortly connect with the mobile user. In another example, mobile device 100 has a speech synthesizer 123 that receives the predefined warning message from memory 115 and projects synthesized speech through speaker 122. In this way, the local warning may be presented to the local user through an earpiece or other speaker. It will be appreciated that the warning message may take alternative forms and be presented through various output devices.

Figure 4:
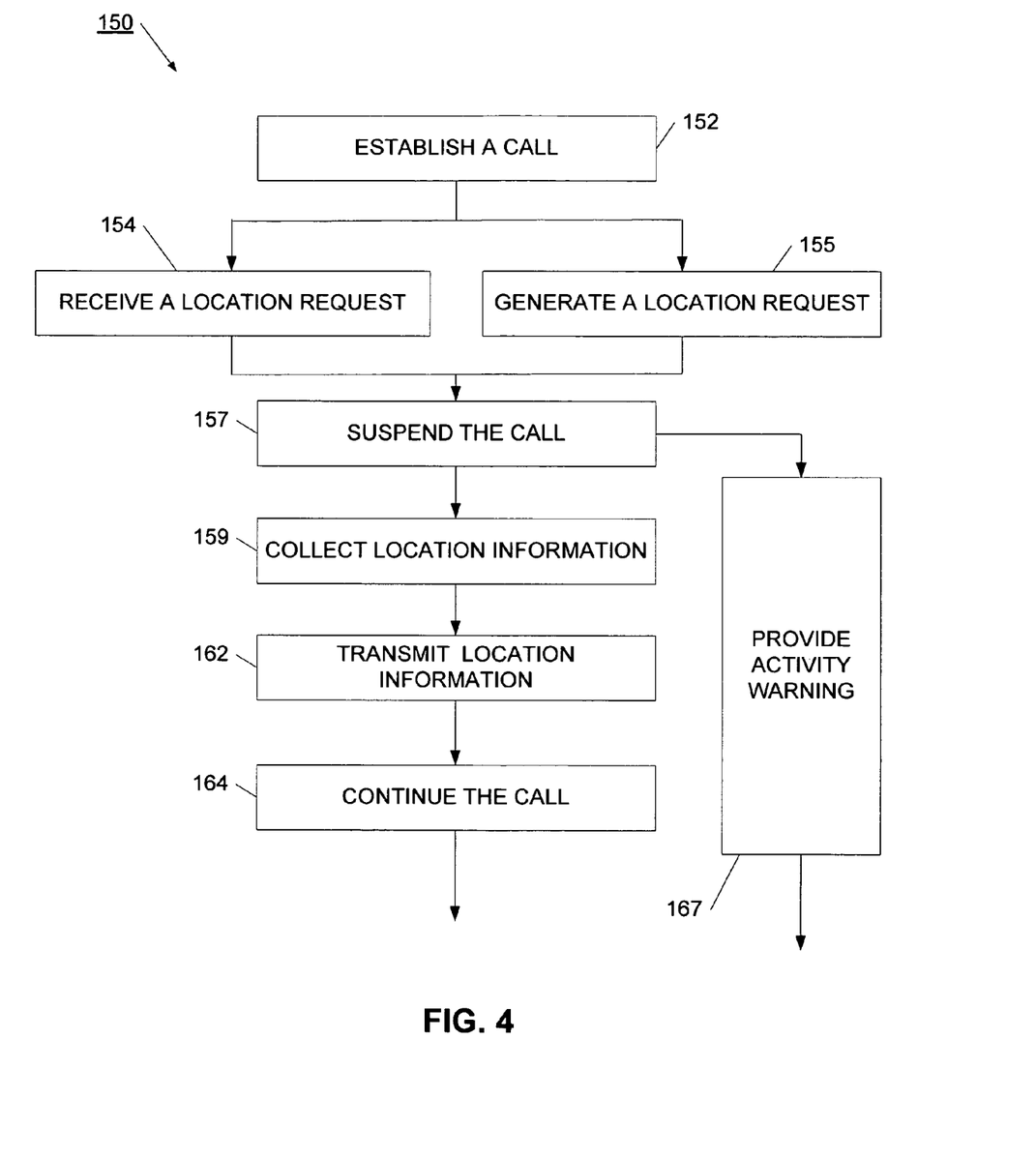
FIG. 4 is a flowchart of a call process in accordance with the present invention.

Referring now to FIG. 4, method 150 for processing a call is illustrated. Method 150 has a mobile wireless device establish a call as shown in block 152. The call may be a data call, a voice call, or a combination of voice and data. It will be understood that the call may be in progress, or may just be originated by the mobile device. In one example, the call is a data call with the mobile wireless device exchanging information with a network server, such as a traffic or map server. In another example, the call is an emergency call that the mobile user is placing to obtain emergency assistance. The call is established on communication radio operating according to a communication standard. In another example, the communication call is according to a data transmission standard such as 802.11 or other data transmission standard.

The mobile device receives a request for position location information. This request may be received on a communication, control, or signaling channel from a remote device as shown in block 154, or may be generated locally by the device as shown in block 155. Responsive to receiving the request, the mobile device disconnects or turns off the communication radio receiver as shown in block 157. Since normal call activity will not be appearing at the mobile device, an activity warning is provided as shown in block 167. This activity warning they take the form of a visual display, a textual display, a graphical display, or an audio or aural output. It will be appreciated other types of local warnings may be used. This local warning acts as a surrogate to reassure the mobile user that call activity is proceeding normally, and that the lack of normal call activity is to be expected and temporary. The local mobile device then collects position location information such as GPS data as shown in block 159. After the GPS data has been collected, the mobile device transmits the location information as shown in block 162. It will be appreciated that the location information may be sent on the call channel, or may be sent on a different channel. The mobile device returns to normal call activity so the mobile user may continue the call, as shown in block 164. Since the mobile user now perceives normal call activity, the activity warning may be deactivated. It will be appreciated that the activity warning may be removed at different steps in the call process, depending on the particular standard used and the level of call activity evident to the user.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A method for call processing operating on a mobile device, comprising:
   placing an emergency call;
   opening a communication channel to an emergency call center;
   receiving a request for position location information;
   suspending a voice part of the communication channel;
   retrieving a warning from a memory of the mobile device;
   activating the warning while the voice part of the communication channel is suspended;
   collecting position location data while the voice part of the communication channel is suspended;
   transmitting position location information using a data part of the communication channel;
   resuming the voice part of the communication channel; and
   deactivating the warning.

2. The method for call processing according to claim 1, wherein the communication channel comprises a control, a data, or a voice channel.

3. The method for call processing according to claim 1, wherein the communication channel complies with a OSM, CDMA, W-CDMA, CDMA2000, or UMTS communication standard.

4. The method for call processing according to claim 1, wherein the warning is a textual display on a screen that presents information that an emergency call is progressing normally.

5. The method for call processing according to claim 1, wherein the warning is an aural message played through a speaker that presents information that an emergency call is progressing normally.

6. The method for call processing according to claim 5, wherein the aural message comprises synthesized speech.

7. The method for call processing according to claim 1, wherein the warning comprises:
   a key challenge that requires additional operator steps to interrupt the emergency call; and
   a textual display on a screen that presents information that the additional steps are required to interrupt the emergency call.

8. The method for call processing according to claim 1, wherein the position location data is GPS data collected from a plurality of satellites.

9. The method for call processing according to claim 1, wherein the warning is deactivated responsive to reopening the voice part of the communication channel.

10. The method for call processing according to claim 1, wherein the warning is deactivated responsive to transmitting the position location information.

11. A mobile wireless device, comprising:
    a radio frequency (RF) receive chain;
    a communication radio and a GPS receiver sharing the RF receive chain;
    switch circuitry for allowing the communication radio to use the RF receive chain in a first state or the GPS receiver to use the RF receive chain in a second state;
    detection circuitry acting responsive to the GPS receiver using the RF receive chain;
    a memory holding a predetermined warning message, the memory residing in the mobile wireless device; and
    an output device operably coupled to the detection circuitry, the output device configured to present the predetermined warning message by retrieving it from the memory when the GPS receiver is using the RF receive chain, the output device further configured to remove the predetermined warning message when the communication radio is using the RF receive chain, the RF receive chain further configured to remain open when the switch is in the first or the second state.

12. The mobile wireless device according to claim 11, wherein the communication radio complies with a GSM, CDMA, W-CDMA, CDMA2000, or UMTS communication standard.

13. The mobile wireless device according to claim 11, wherein the detection circuitry further detects that a call has been established with the communication radio.

14. The mobile wireless device according to claim 11, wherein the detection circuitry further detects that an emergency call has been established with the communication radio.

15. The mobile wireless device according to claim 11, wherein the output device is a display screen, and the predetermined warning message is a visual display that presents information that a call is progressing normally.

16. The mobile wireless device according to claim 11, wherein the output device is a speaker, and the predetermined warning message is an aural message that presents information that a call is progressing normally.

17. A method for call processing, comprising:
establishing a call at a local device;
opening a communication channel from the local device;
receiving a request for position location information;
suspending a voice part of the communication channel;
activating a local warning that resides on the local device while the voice part of the communication channel is suspended, the local warning including a key challenge that requires additional operator steps to interrupt the call and a textual display on a screen that presents information that the additional steps are required to interrupt the call;
collecting position location data while the voice part of the communication channel is suspended;
transmitting position location information using a data part of the communication channel;
resuming the voice part of the communication channel; and
deactivating the local warning upon resuming the voice part of the communication channel.

18. The method for call processing according to claim 17, wherein the communication channel comprises a control, a data, or a voice channel.

19. The method for call processing according to claim 17, wherein the communication channel complies with a GSM, ODMA, W-CDMA, CDMA2000, or UMTS communication standard.

20. The method for call processing according to claim 17, wherein the request is generated at the local device.

21. The method for call processing according to claim 17, wherein the request is received on the communication channel.

22. The method for call processing according to claim 17, wherein the call is a voice call.

23. The method for call processing according to claim 17, wherein the call is a data call.

24. The method for call processing according to claim 17, further comprising the step of receiving the local warning from a remote server.

* * * * *